(12) United States Patent
McDevitt et al.

(10) Patent No.: US 10,740,392 B2
(45) Date of Patent: Aug. 11, 2020

(54) SYSTEM AND METHOD FOR STREAMING INDIVIDUALIZED MEDIA CONTENT

(71) Applicant: HSNi, LLC, St. Petersburg, FL (US)

(72) Inventors: John McDevitt, Clearwater, FL (US); Joseph Pizzuto, Lutz, FL (US); Blaise Lipan, Saint Petersburg, FL (US)

(73) Assignee: HSNi, LLC, St. Petersburg, FL (US)

( * ) Notice: Subject to any disclaimer, the term of this patent is extended or adjusted under 35 U.S.C. 154(b) by 0 days.

(21) Appl. No.: 15/725,802

(22) Filed: Oct. 5, 2017

(65) Prior Publication Data

US 2018/0101611 A1    Apr. 12, 2018

Related U.S. Application Data

(60) Provisional application No. 62/405,528, filed on Oct. 7, 2016.

(51) Int. Cl.
*G06F 16/735* (2019.01)
*G06F 16/9535* (2019.01)
(Continued)

(52) U.S. Cl.
CPC ........ *G06F 16/735* (2019.01); *G06F 16/9535* (2019.01); *G06N 5/027* (2013.01); *H04L 65/4069* (2013.01); *G06N 20/00* (2019.01)

(58) Field of Classification Search
CPC ........ G06F 17/30828; G06F 17/30867; G06N 5/027; H04L 65/4069
See application file for complete search history.

(56) References Cited

U.S. PATENT DOCUMENTS

2007/0025194 A1   2/2007  Morse et al.
2007/0182555 A1*  8/2007  Walker ............... G06Q 10/08
                                                340/572.1
(Continued)

FOREIGN PATENT DOCUMENTS

GB          2455331 A    6/2009

OTHER PUBLICATIONS

European Search Report issued in EP Application No. 17859287, dated Apr. 9, 2020, 8 pages.

*Primary Examiner* — Belix M Ortiz Ditren
*Assistant Examiner* — Dustin D Eyers
(74) *Attorney, Agent, or Firm* — Arent Fox LLP (57) ABSTRACT

A system and method that provides a rule based randomized media content management system. The system includes a database that stores media content that is associated with category metadata that identifies content of the media content with corresponding categories. Moreover, a programming rules engine generates a list of approved media content based on business rules and a predictive rules engine generates media content selection characteristics based on media display device data and media consumption data associated with the viewer. Furthermore, a media content playlist engine is provided that generates a media content playlist by applying the generated media content selection characteristics to the list of approved media content to select media content, such that the resource consumption by the media display device is minimized by selecting media content that is targeted to the viewer of the media display device according to one or more business rules.

18 Claims, 3 Drawing Sheets

(51) Int. Cl.
*G06N 5/02* (2006.01)
*H04L 29/06* (2006.01)
*G06N 20/00* (2019.01)

(56) References Cited

U.S. PATENT DOCUMENTS

| | | | |
|---|---|---|---|
| 2007/0237136 A1* | 10/2007 | Sako | G06F 17/30044 |
| | | | 370/368 |
| 2007/0241990 A1* | 10/2007 | Smith | G09G 5/003 |
| | | | 345/5 |
| 2008/0250067 A1 | 10/2008 | Svendsen | |
| 2011/0239253 A1 | 9/2011 | West et al. | |
| 2013/0191749 A1 | 7/2013 | Coburn et al. | |
| 2017/0104789 A1* | 4/2017 | Cudak | H04L 63/20 |

* cited by examiner

SYSTEM AND METHOD FOR STREAMING INDIVIDUALIZED MEDIA CONTENT

CROSS REFERENCE TO RELATED APPLICATIONS

The current application claims priority to U.S. Patent Provisional Application No. 62/405,528, filed Oct. 7, 2016, and entitled "System and Method for Streaming Individualized Media Content", the entire contents of which are hereby incorporated by reference.

BACKGROUND

A wide variety of media content may be delivered to and presented via a broad assortment of content presentation devices, such as desktop computers, laptop computers, tablet computers, personal digital assistants, smart phones, media streamers (e.g., Roku, Echo, etc.), smart TVs, and the like.

Moreover, recent developments in communication technologies enable media content streaming to be provided to a user on these devices when the user is in a specific location or when they are traveling. The content may be delivered by means of wired, Wi-Fi, Bluetooth, private or public wireless internet protocol (IP) technologies, amongst others. For example, wireless data networks were developed primarily to provide voice communication services to mobile phones. However, wireless service providers also now use their wireless data networks to provide for the streaming of media content that can be received by and viewed on consumers' mobile devices. Such streaming media content may include, amongst other things, live or on-demand video segment selections of videos, movies, or television programming.

While communication speeds in wireless data networks continue to improve, there are still limitations for video streaming technologies and consumer charges for the amount of data consumed. For example, if a consumer is using a smart phone to access a video presentation service such as youtube.com, the user can be presented with a number of related videos that are streamed in a sequential manner. The videos are often related to each other, targeted to a user's preferences, past viewing history, or the like and generally assembled in a fixed playlist format. However, even though such services provide a certain level of user preference and customization, most often the play list is generic and static (i.e., the same videos in the same order for a significant amount of time), such that users end up skipping many videos and cycling through several videos before arriving at a video that they actually want to view in its entirety.

This type of presentation of content to users creates two significant technical issues. First, each video transmitted over a wireless network consumes bandwidth, and, therefore, the transmission of numerous videos that are often unwatched consumes a significant amount of bandwidth. Second, the content presentation device itself is still required to receive and store, at least temporarily in a data buffer, a portion or all of the unwanted video. As a result, the device's resources and processing requirements are continuously used for unnecessary actions. This behavior of the consumer being presented with content that the consumer does not really want also creates two significant consumer issues. Specifically, it increases the amount of data the consumer has downloaded often increasing their expense (and/or the data used goes against their data "caps"), and most importantly, it wastes the consumer's time. These technical issues and consumer issues often combine and reinforce each other such that users will choose not to utilize a given content presentation service because of all of the negative elements of the experience.

SUMMARY OF THE INVENTION

Accordingly, there is a need in the industry for a method and system that identifies, organizes and transmits media content with a high likelihood that it will be meaningful to the individual viewer, consumed by the viewer, and designed such that it would limit the unnecessary consumption of network bandwidth, presentation service resources, user device resources, user data capacity, and user time. This improved system and method would not only reduce the waste of resources, but improve the user's overall media content consumption experience providing better more meaningful content to the user. Additionally, it is critical that the collection of media content that is selected and presented to the user is presented in a way that makes the content appear to be fresh and new, not just a rote playlist that is always the same (or highly similar) and repetitive—each time they view the general topic of the playlist.

The system and method disclosed herein provides a rule based randomized and individualized media content management system. The media content includes, but is not limited to, a subset of or collectively: audio, video, text, images, computer generated graphics/images (including but not limited to related physics engines, logic engines, impossibility limiters, etc.), Virtual Reality (VR) content, Augmented Reality (AR) content, graphical overlays, visible and invisible data, metadata, contextual data, use data, preference data, trend data, transactional data, and other similar data related to the media content (hereinafter referred to as the "Content"). Furthermore, the Content may be live or pre-recorded and the live content may be truly live, or originally live and re-presented, or a combination of both. Also, the Content can be spontaneously generated or previously generated and displayed in real time (or a combination of both) as in the case of computer generated Content, VR Content, or AR Content. Alternatively, the Content could have never been presented live and is just previously recorded, also the Content (live or pre-recorded) may be streamed live or be on-demand. The same Content could be presented to one or more viewers. In addition, each type of, classification of, or metadata about any Content may allow each piece of Content to fall into one or more specific categories that can be utilized for identification and sorting of the contents of the Content library.

The term "rule(s)" is used generically (often in the simplest form being If-Then statements) and may include one, some, or all set(s) of rules including, amongst others, Content rules (inclusions, exclusions, title, subject matter, date of creation, language, duration, rating, geographic location, maximum length, minimum length, maximum number of results, minimum number of results, bit rate, Content dimensions, format, historical view count, "likes", reviews, date of consumption, rates of completion, etc.), business rules, individualized or grouped preferences, individual or grouped viewership/sales trends, and variable randomization methodologies may be in whole, partially, or individually utilized to create a sequential playlist or "channel" that is unique and customized to the individual Content view request of the viewer. Furthermore, these rules may act as logical engines that may organize, prioritize, include, exclude, change the likelihood, etc. of a given playlist having a specific piece of Content in it. A playlist describes a set of Content that can be consumed by a viewer. Please note the terms "user", "viewer", and "consumer" are used interchangeably, generically, and could mean any consumer of any of the Content and the user could be a human individual, a group of humans, an animal or animals, another computer system or set of systems. Additionally, the term "view" is used generically and can mean any method of consumption of the Content (e.g., read, watch, listen to, play (in relation to games), interface with, or otherwise experience).

The resulting channel may have many of the characteristics of a traditional linear channel, but is generally unique to each viewer and unique to each time that a viewer initiates the playing of a channel (i.e., unique for each viewing session). It should be understood that it is theoretically statistically possible for the same playlist to be created more than one time—but given a sufficient quantity of Content, it is unlikely that the same channel is created more than once for a given viewer, although it should also be appreciated that rules could be set so that this definitely does or does not happen.

The channel may be played-out via IP, Wi-Fi, Bluetooth, or similar two way communication technologies on any connected device (e.g., a smartphone, tablet, personal computer, laptop, media streamer, smart TV, smart home speaker, smart home appliance, or the like) that can also support two way communication and play-out of the Content via user interface—e.g., a display, speakers, data interface, etc. Furthermore, the disclosed system and method may provide for a feedback loop that enables the system to dynamically learn and adjust the Content selection and distribution.

In some cases, the disclosed system provides for continuously or periodically changing and updating the playlist such that the final playlist that has played out is different than the playlist that was initially created for the viewing session. These changes may be based on one or more of any relevant data such as historical Content consumption rates, viewer reviews/feedback/"likes", sales performance, resulting subsequent behavior, and any other Content related results (both from the individual viewer and/or from a plurality of users— including up to the full population of Content consumers), and also external data sources (relevant related but external data, trends of others that have or are consuming similar or related playlists, historical or current media trends, product sales trends, news events, predicted trends, etc.). The feedback loop may use various sets of information and machine learning/artificial intelligence (AI) analysis to improve the viewer experience by creating improved customized playlists to be presented to the user. Next generation AI systems may use quantum computing methodologies to aid in the playlist optimization process. Furthermore, these AI based approaches may be used specifically for improved interactive game play, VR/AR experiences, and non-predetermined storytelling (in which there are not pre-defined plots or endings to playlists, but rather they develop through use at the group and/or individual level with written, spoken/verbal, game and/or video Content). This improvement system may be utilized for future playlists or also even as the playlist is being consumed and the playlist Content that has not yet been consumed (or created) and may be altered based on this dynamic learning methodology to improve the remaining playlist to be consumed.

In alternative embodiments, additional third party preference or use data may be utilized to identify Content with greater relevance to be included in the playlist for playout for any particular viewer in any particular viewing session. This additional data may even be individualized down to the device level. For example, a viewer may be presented with two different playlist rule sets for viewing on a TV versus viewing on a smart phone (e.g., the duration of the individual elements, file format of the Content, bit rate of the Content, aspect ratio of the Content, etc. may be different based on the Content consumption device of the user). Accordingly, the disclosed system may be configured to first identify the particular device being used by the viewer and then select the appropriate content for transmission to and display on that device as part of the playlist. Additionally, these or other similar differentiating aspects of the Content in the playlist may be influenced by the network the Content is played over (e.g., home Wi-Fi or pay per bit delivered mobile networks, high bandwidth networks or low bandwidth networks, etc.), or the technical ability of the play-out device (e.g., a speaker alone versus a 4K television versus a VR gaming headset). Furthermore, it should be recognized that the resulting channel may be a collection of a wide variety of different Content, including but not limited to, entertainment, education, information, commerce, and the like.

DETAILED DESCRIPTION

The following detailed description outlines possible embodiments of the proposed system and method disclosed herein for exemplary purposes. The system and method disclosed are in no way meant to be limited to any specific combination of hardware and software. As will be described below, the system and method disclosed herein relate to the creation of a rule based randomized individualized playlist of media Content. An exemplary embodiment of a system employs a number of components illustrated in FIG. 1, which includes the components described below. It should be appreciated that each of the components are illustrated as simple block diagrams, but include the requisite hardware and software components needed to perform the specified functions as would be appreciated by one skilled in the art. For example, one or more of the components described below can include one or more computer processor units (CPUs) configured to execute software programs stored on electronic memory in order to execute the algorithms disclosed herein, and these CPU may be located together or apart.

Figure 1:
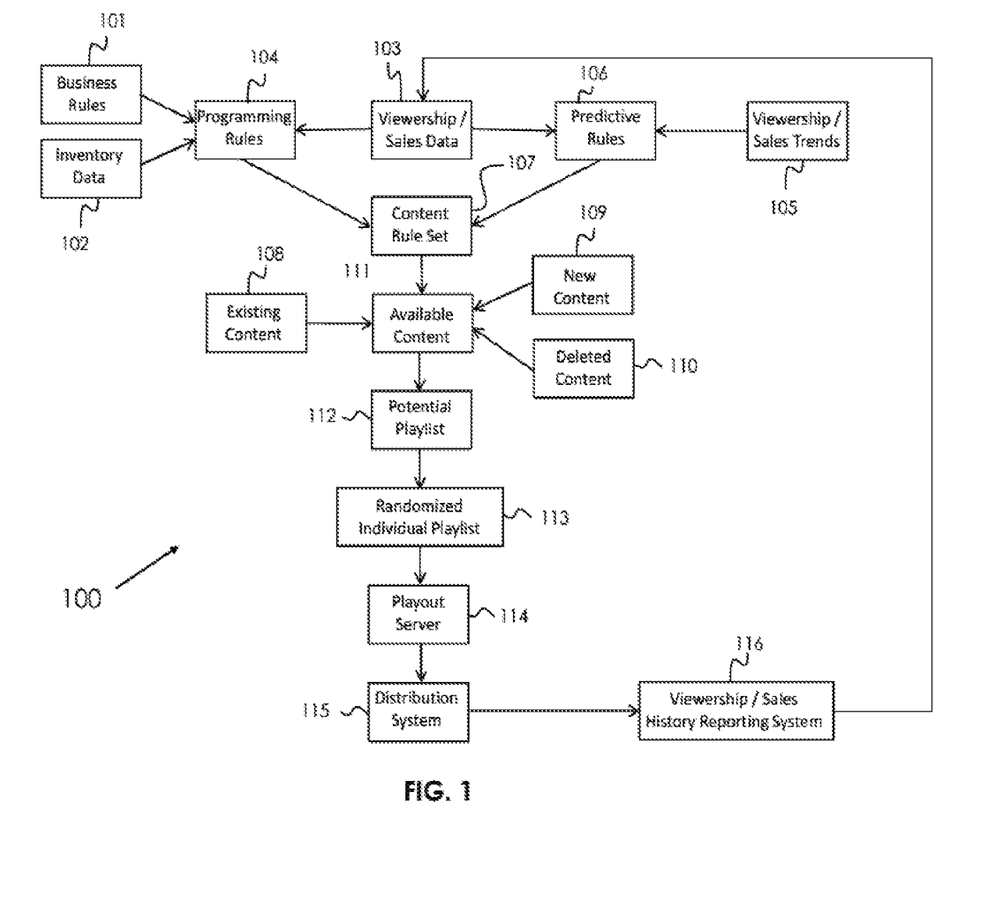
FIG. 1 illustrates a block diagram of a system for creating a rule based randomized and individualized media Content management system in accordance with an exemplary embodiment.

In general, the system can be considered a Rule Based Randomized Individualized Content Management System (100). This system (RRI-CMS) is provided for creating, managing, analyzing, randomizing, improving, reporting on and distributing playlists of Content to users of various distribution systems and display device systems. The Content can be real-time (e.g., live Content), or after real-time (e.g., pre-recorded Content), or spontaneously created Content or any combination of these types of Content. The specific components and functionality of the RRI-CMS will be described in more detail below. It should be noted that each of the following elements may be performed systematically and automatically without human intervention, or each may also be performed with a manual (human) override (or a combination of both). Additionally, the rules of this system (100) may be pre-set or may be dynamically adapted in real-time (or periodically), and the adaptations may be based on the information that is available at that time, and also as additional information becomes available the rules may be further dynamically (or periodically) adapted. These changes may be based on either or a combination of human or machine/AI input as will be described in more detail below.

According to the exemplary aspect, the RRI-CMS (100) has a set of Business Rules (101) (rules), which may be an extensive set of rules that can be used to set requirements for the Content that is placed in a playlist. The Business Rules (101) can be stored in electronic memory, a rules database, or the like, for example. Moreover, these rules can cover a wide variety of things including or excluding, by way of example, but not limitation: Content inclusions, exclusions, placements, prioritization, weighting based on; title, subject matter, date of creation, language, duration, rating, geographic location, maximum length, minimum length, maximum number of results, minimum number of results, bit rate, Content dimensions, format, historical view count, "likes", reviews, date of creation, rates of completion, business rules, individualized or grouped preferences, individual or grouped viewership/sales trends, Content of a certain age, that includes certain elements, has resulted in a certain level of sales, has provided a certain quantity of viewership, is related to certain brands/personalities, or there is a desire to promote, and the like. There may be different rule sets based on elements, including but not limited to; the viewer, viewer profile, viewing device, viewing time, viewing location, viewing history and the like. The different variable characteristics that drive the selection of the Content for the playlist may be weighted in any proportion as deemed appropriate such that Content items may be specifically included, excluded, prioritized, and/or given a likelihood of being included in a final playlist.

Cumulatively, the Business Rules (101) provide the definition of what results of the consumption of the Content playlist(s) are to be optimized as a result of the entire RRI-CMS. Some examples of what may be optimized include maximization user satisfaction, enjoyment, view time, user engagement (measured in a variety of ways including but not limited to—recall of content, advertising effectiveness, sales of products presented in the Content, education from and understanding of the Content presented, or other various means), profitability of playlists based on subscriptions to Content in playlists sold, profitability of advertisements in Content (for example advertisement sales rates driven by amount of advertisements consumed or the highly targeted focus of individually relevant advertisements, or other means), and the like. Alternatively, optimization may be the minimization of Content skipping/rejection, minimization of bandwidth waste (Content sent to a user but not consumed), minimization of distributor and/or user processor waste (Content sent to a user but not consumed), or a combination of various maximizations and minimizations that collectively are the goal(s) of the Business Rules (101). Said in another way, Business Rules are the set of requirements that are put in place to achieve the overall goal(s) of the RRI-CMS. Thus by way of example, but not limitation, the overall goals of the RRI-CMS may be to provide any given user the playlist that during that given consumption experience has Content in it that seems fresh and new, relevant to the user such that there is no excess or inappropriate Content delivered and no resulting waste of bandwidth, system resources, or time while simultaneously delivering Content that effectively encourages the user to purchase items featured in the Content—these collectively are established in the Business Rules (101).

Furthermore, these rules may change over time according to an exemplary aspect. In one exemplary embodiment, the Business Rules (101) may define certain classifications of videos based on a corresponding user trait and limit the selection of videos that match that classification. For example, as discussed below, all video content is stored in Available Content Library (111), which can be a Content database, data store and the like. Each video may be stored with associative metadata to classify/characterize the data. For example, all videos relating to baseballs, football cleats, golf clubs, etc., maybe be associated with a "sports" metadata tag. Similarly, all videos presenting rings, necklaces, watches, etc., maybe be associated with a "jewelry" metadata tag. Then, each metadata tag may be associated to one or more user traits, which can include, for example, previously requested videos. Thus, if a user previously watched a video on Super Bowl highlights, the user may be identified with the "sports" metadata tag, which will in turn limit the selection of all videos presented to that user, at least during one given viewing experience. In the exemplary aspect, the Business Rules (101) can be created (by a system administrator and/or automatically by the system, for example) and/or dynamically modified and updated based on the feedback data. More details of this selection will be discussed below.

The Inventory Data (102) may include a variety of information about inventory of product available to present as video clips and/or the products available to sell. By way of example, but not limitation, product availability of a certain price, units available, brand, etc. may be a required element in the creation of playlists. Thus, in a similar manner to that described above, each video will have associated metadata related to these required elements. Moreover, it should be noted that Inventory Data (102) generally applies to a commerce or gaming related playlists where available units or inventory is meaningful, however, other playlists (even including commerce or gaming playlists), may be created without the use of Inventory Data in alternative embodiments. The Inventory Data (102) can also be stored in the same electronic memory or database as the Business Rules (101), or different electronic memory or database, for example.

The Viewership/Sales History (103) includes data related to Content, content elements or products and how they have performed or are performing in either other distribution systems/platforms (including but not limited to, Over the Top (OTT) platforms, web browsers, mobile browsers, game consoles, etc.) or through the RRI-CMS system(s) or a combination of these. Additionally, this information may be at the individual, device, group, and/or population level. This information may be fed back periodically or continuously through the system dynamically or as requested (via the Viewership/Sales History Reporting (116) system) influencing the creation and adaptations of the playlist(s), including but not limited to, at the individual, device, time, group, and/or population levels. This data may be used to drive the Business Rules (101) as well as the Predictive Rules in order to optimize the playlists that are created. For example, data relating to the most highly viewed videos, the videos that are skipped after a given amount of time (e.g., 5 seconds), videos that have a high level of user engagement, videos that have a high correlation with sales of products included in them, and the like, will drive the Programming Rules and decision making processes for the selection of the Content for each playlist. In one aspect, the Viewership/Sales History (103) may use the related data to profile each user and derive traits of that user that can drive the selection of Content for each playlist. For example, based on any or all of the viewing history, purchase histories, product search histories, name, and the like, the system can derive a user profile that includes, amongst other things any or all of demographic profile, marketing cohort estimated age, gender, interests, hobbies, and the like, which may be used in future playlist Content choices.

The Programming Rules (104) are a rules engine or system that aggregates rules and information from the Business Rules (101), the Inventory Data (102), and Viewership/Sales History (103) to arrive at an approved list of potential videos that are eligible to be included in any potential playlist, including but not limited to, at a device, individual, group, and/or population level. Thus, in one aspect, the Programming Rules (104) are created, updated and/or executed by one or more processors of the RRI-CMS (100) to apply Business Rules (101) to the Inventory Data (102) and/or Viewership/Sales History (103) to the Available Content Library (111) to generate an approved list of potential videos.

The Viewership/Sales Trends (105) are broad and possibly external data sets that describe viewership and sales behavior/preferences that may be utilized to enhance and improve the Predictive Rules (106). This data may be historical and related to the user(s) data that comes via the Viewership/Sales History (103) or may be from external information sources (e.g., TV ratings for a given demographic that matches the viewer) and in each case may be available at the device, individual, group, and/or population level. Additionally, the external data may come from a variety of sources including amongst other things, audience/viewership tracking companies (e.g., Nielsen, Google Analytics, etc.), MVPDs, CDNs, OTT systems, and the like. The internal or external data may be provided continuously or periodically.

The Predictive Rules (106) is a rules engine or system to optimize the playlist to achieve established goals (e.g., Business Rules (101)), which may include amongst other things, the viewership/sales performance of the individual elements of Content that may be included in the playlist, based on various characteristics of the Content and the related user. In one aspect, the Predictive Rules (106) combine data from both Viewership/Sales History (103) and Viewership/Sales Trends (105) to create a list of video characteristics that are of the highest viewership/sales value (Business Rule (101) value) at, including but not limited to, a device, individual, group and/or population level. Machine learning or AI may be utilized through modeling and iterative playlist testing (in actual viewer use or modeled viewer use) to help improve the strength of the Predictive Rules (106). Additionally, quantum computing may be used to find higher quality initial test cases rather than needing to go through processor intensive "brute force" approaches that run through very many cases in an attempt to arrive at optimized playlists. Alternatively, machine learning/AI/quantum computing may be used to review Content consumption patterns to suggest more appropriate or more valuable Business Rules (101) that may be used to support new business cases.

The Content Rule Set (107), which can be considered a media Content playlist engine, is configured to combine the Programming Rules (104) with the Predictive Rules (106) such that a playlist with certain characteristics can be created which can be limited by the Programming Rules (104) and optimized by the Predictive Rules (106). While the Programming Rules (104) and the Predictive Rules (106) are created in very different ways, the Content Rule Set (107) joins both rule set limitations/requirements into one larger set that ensures that any Content that may be considered for inclusion in the final playlist satisfies all of the requirements established in the Programming Rules (104) and the Predictive Rules (106). In other words, using the rules described above, the system is configured to generate a Content Rule Set (107) that defines a customized, optimal playlist for a given user for a particular viewing session. This optimization may provide a complete playlist or an initial playlist that may be adapted based on dynamic or periodic feedback.

The Existing Content (108) is the pre-existing library/database of existing Content that a playlist can be initially built from. It is noted that due to the dynamic nature of the Available Content Library (111) database there are frequent additions of New Content (109) and removal of Deleted Content (110) that need to be considered as playlists are created. Additionally, the Content can be live (e.g., truly live or dynamically created Content), or after real-time (e.g., pre-recorded Content), or a combination of live and pre-recorded Content. It should be appreciated that the created playlists as described herein will typically be a subset of the Existing Content (108) that is parsed based on the plurality of rules and processes described herein to identify the optimal media Content to be transmitted toward the end viewer for consumption.

The New Content (109) is Content that may be added to the Available Content Library (111) at any given time. This New Content (109) may be pre-existing Content in other libraries, but it is only at this time being supplied to the Available Content Library (111). Additionally, the Content can be live (e.g., truly live or dynamically created Content), or after real-time (e.g., pre-recorded Content), or a combination of live and pre-recorded Content. The Deleted Content (110) is Content that may be removed from the Available Content Library (111) at any given time. In this aspect, instructions are sent from the database of Deleted Content (110) instructing the Available Content Library (111) to remove the one or more "deleted" Content items from the list of available Content for use in playlists. The Available Content Library (111) is a library/database that is the net accumulation of Existing Content (108), New Content (109), and Deleted Content (110) from which a playlist may be constructed. The final playlist may consist of the contents of the entire Available Content Library (111) or any subset thereof. It should be appreciated that each of Existing Content (108), New Content (109), Deleted Content (110) and Available Content Library (111) can be Content that is stored in one or more electronic databases, data stores, or the like, and that can be managed by one or more processors of the RRI-CMS (100), as should be appreciated to one skilled in the art.

The Potential Playlist (112) is created when the Content Rule Set (107) is applied to the Available Content Library (111) by the RRI-CMS (100), which generates the results in the Potential Playlist (112). In other words, a processor/server of the RRI-CMS (100) may be configured to execute software code defined by the Content Rule Set (107) against the Content in the database of the Available Content Library (111). The result of this process is the set of Content (i.e., an optimal subset of the available Content) selected as the Potential Playlist (112) that satisfies the Business Rules (101) and has greatest likelihood to achieve the established goals. It may be the case where a variety of different sets of Content and related playlist sequences have an equal likelihood of achieving the established goals.

The Randomized Individual Playlist (113) sequences the Content provided by the Potential Playlist (112) by applying randomization rules. That is, the RRI-CMS (100) is configured to apply randomization rules to the Potential Playlist (112) to generate the actual sequence of the media Content playlist to be transmitted to the consumer. In an exemplary aspect, these randomization rules are a variety of rules that may now be applied to the playlist Content set to introduce chance into the selection of Content items and/or the sequence of Content items that are included in a playlist. This randomization allows the playlist to appear fresh and new—similar to a linear channel—it is not a repetition of the same playlist (with the identical or near identical content and order) to the viewer (or to different viewers). A variety of standard randomization approaches may be used, including but not limited to any one of the following techniques (or a combination of multiple techniques, with or without element repetition, and with or without sequencing); simple, replacement, block, permuted block, biased coin, minimization, stratified, covariate adaptive, and response adaptive. In application and testing of the various randomization techniques subject blinding may be used. This variety of presentations that is achieved through randomization provides additional observations related to the performance of different Content in different sequences that may be used to further improve optimization analyses and resulting playlists. Additionally, the randomization may also have rules and limitations that amongst other things, give prioritization or a higher likelihood (weighting) of various Content items or types of Content items with specific characteristics based on rules similar to the Programming Rules (104) that are applied to the Potential Playlist (112) to create unique playlists. The weighting(s) may be established by an individual or by a system and take into consideration, by way of example, but not limitation, Content that is generally preferred by the Content provider, Content provider featured Content, sale Content, timely Content, excess inventory Content, Content that is ranked highly by various statistical models, Content or Content types selected or preferred by the user (or other users), etc. The playlists may each be unique down to the time of playout on a device level. Thus, the randomization rules may be applied each time an individual requests the start of a playlist. Furthermore, the randomization and randomization rules can be created and applied by the Content distributor rather than by the Content consumer. Also, in an alternate embodiment, the randomization rules may be implemented on the user's viewing device and applied to the Content after it is received by the viewing device and stored in the memory buffer or applied as the user(s) device requests a playlist from the Content provider.

Once the Randomized Individual Playlist is created, the resulting requested Content playlist is streamed out of a Playout Server (114) toward the user. The server may distribute the Content of the playlist itself, or it may distribute URLs (or other similar Content file addresses/identifiers) related to the Content listed in the playlist, or a combination of both. Additionally, the entire playlist does not need to be created prior to starting playout. Playout requires only one Content element in the playlist to begin playout and additional Content may be added to the playlist over time. In other words, the first Content item may be transmitted toward the viewer for consumption as the RRI-CMS (100) continues to build and adapt the playlist. In one aspect, Content may also be removed from an established playlist prior to playout if, for a variety of reasons that piece of Content no longer complies with the Content Rule Set (107), and/or would be considered to be deleted content.

The Playout Server (114) may pass the Randomized Individual Playlist Content via The Distribution System(s) (115) to or toward any IP connected device or system including but not limited to, MVPDs, CDNs, smart devices (TVs, Phones, PCs, Tablets, etc.), or other IP content devices (e.g., Roku, Apple TV, Amazon Fire TV, other computer systems, etc.), individually or collectively these may be considered media display devices or Content display devices.

The Viewership/Sales History Reporting (116) is feedback data/information about how Content is consumed by viewers which is captured on the device, for example, and fed back periodically or continuously to help populate the Viewership/Sales History (103), dynamically or as updates are requested. The Viewership/Sales History Data about Content is captured at the individual user, device, time level and may be aggregated at the individual, population, or sub-set level. This usage data may be analyzed through a variety of human or machine/AI means to find correlations (causative or not) between various sets of Content, Content consumption behavior, and goals. It is further noted that the discovered relationships between Content as delivered and user behavior may be utilized to create new or alternative goals. The capture of Content consumption data may be collected through a variety of means including, but not limited to, Content distributor Playout Server (114) distribution information, distribution network packet transfer information, and/or user device (e.g., video player) usage reporting, as well as, other secondary systems that may be queried such as product sales systems, inventory systems, product search systems, and the like. As noted earlier, the Viewership/Sales History (103) may include which Content is consumed in their entirety, which Content is skipped after a short period of time, what is trending Content for other users, which content is correlated with sales of products included in the Content, which Content drives high user engagement, and the like. Through analysis of this information playlists that have a higher likelihood of achieving the goals may be created and these insights may be fed back into the system (Viewer/Sales History (103)), in order to dynamically or periodically update the playlist creation process.

Moreover, in addition to the Viewership/Sales History Reporting (116), the feedback data can include information relating to the viewing device itself, including hardware and/or software parameters and capabilities of the viewing device that enable the receiving and display of media Content. For example, this information may include information regarding screen size, speaker capabilities and the like of the viewing device. In turn, the Content Rule Set (107) may limit the playlist of selected media Content items for transmission to the viewing device based on those items that are deemed to result in a favorable consumption experience from the viewer's perspective based on the device parameters and capabilities.

In the event that a user requests a playlist there are multiple possible embodiments of the current invention including amongst others, the following.

Figure 2:
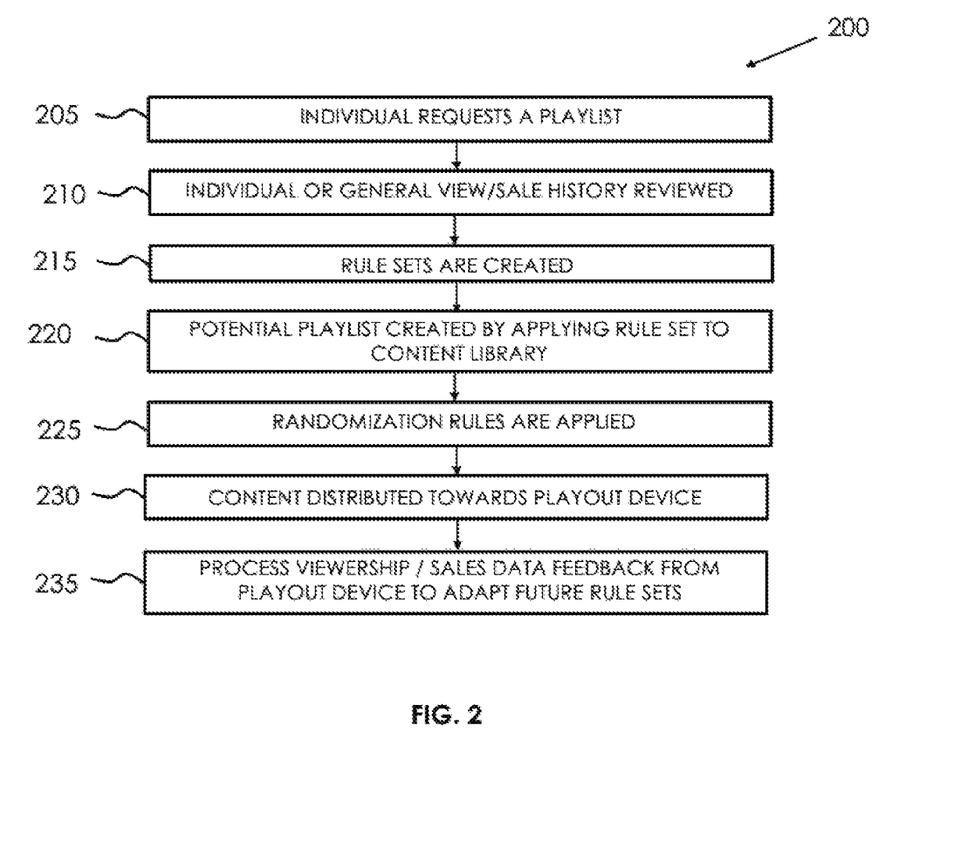
FIG. 2 illustrates a flowchart for a method of creating a rule based randomized individualized Content management process in accordance with an exemplary embodiment.

FIG. 2 illustrates a flowchart for a method according to an exemplary first embodiment. Initially, a viewer requests a playlist (205), which can be a user's action with their content consumption device to visit a website, launch a software application, or similar action which results in the described System (100) to begin the process of providing a playlist to the user. Upon receiving the request, the System (100) queries the Viewership/Sales History (103) to see if there is a viewer, viewer device, group or general population history that can be applied (or associated with the request (210)). It should be noted there does not have to be any history in order for a playlist to be generated and this historical data may just be used to improve the matching of the Content to the user. The data that is used may include but not be limited to, a mix of individual, device, regional, marketing cohort, geographic, temporal, broadly generic, or any other grouping and weighting by characteristics seen to be most appropriate to optimize the viewing experience. The history, if any, and the external data, if any, may be combined to create a set of Predictive Rules about Content that is most likely to achieve established goals.

Next, at step (215), the Programming Rules (104) are combined with the Predictive Rules (106) (it is noted that if there are not any Predictive Rules (106), the process to build the playlist may still continue) to create the Content Rule Set that will be applied against the then current Available Content Library to arrive at a set of Content that fits all of the requirements to be included in the playlist. All of the resulting Content of the potential playlist (220) is qualified with respect to the Programming Rules to be provided to the requesting viewer.

Randomization Rules (104) are then applied to the qualified Content (225) to create the actual initial playlist. The randomization rules may be set by the programmer/administrator/business not by the viewer, though the application of these rules may be applied to the Content. However, in an alternate embodiment the user may be able to enable or disable the Randomization Rules (104). These rules can be extensive and apply to all of the different characteristics of the Content and there can be different prioritization or weighting applied to the different Content characteristics (e.g., 10% chance a video showing an electronics item will be included but a 100% chance a feature item is shown $2^{nd}$ in the playlist, while there is a 50% chance that a Beauty Product item is shown in the first 5 positions in the final playlist, etc.). This randomization applies each time a playlist is requested ensuring that most likely the same viewer will not get the identical playlist more than once in a row. Additionally, the Randomization Rules (104) (which may be set at varying degrees of randomization) may in turn be further randomized to add additional variety to the requested playlists. Also, the randomization may be used to test a variety of playlists across various sample sets of users (1 up to many users).

As discussed earlier the randomization that occurs with each playlist request is important to help each playlist to appear fresh and original, rather than rote and repetitive as is common with traditional playlists, however, randomization also provides an approach to arrive at playlists that are better able to achieve the playlist goals by providing a collection of different playlists that can be tested through use (or modeling). Iterative randomization across sets of users may be utilized to further improve the process of creating the playlists. Additionally, AI learning (including quantum computing) may be applied to analyze the playlist performance and use that information to further optimize the playlists to better achieve set goals, or alternatively the analytical system may use the performance information to help create new goals. The process of randomization and related optimization can create playlists that are completely unique to an individual user of an individual device at an individual time (truly one to one playlist to playout) or one playlist to more than one user. The resulting information may be applied periodically or instantly (or close to instantly) to change future Content in the playlist for an individual user or also to change the future Content for multiple users.

Once the initial Content playlist is created the playlist is distributed to the viewer of the requesting playout device (230). For example, the Playout Server (114) transmits the Content over one or more networks to the viewing device of the user. As the Content is consumed and reacted to by the viewer, data including but not limited to, the viewing behavior and the Viewership/Sales data is captured and fed back into the Viewership/Sales History data set (235) for use for future optimized Rule Sets or to dynamically change/update future Content in the initial playlist that has not yet been transmitted and/or played out to the consumer/viewer.

In an additional example of a video playlist, there is an Available Content Library (111) which consists of the net of Existing Content (108), plus New Content (109) that has been added, less Deleted Content (110) that has been removed. This Available Content Library (111) includes for example 10,000 individual videos on a variety of subjects. Business Rules (101) to establish optimization goals may now be applied to create a potential set of videos for the viewer. In this example, the maximization goal is to use videos to sell beauty products to a viewer while minimizing the viewer's data bandwidth and time consumed. The video playlist requesting viewer is interested in videos about Beauty Products which reduces the number of videos in the applicable Available Content Library (111) down to 1,000 videos. As described above, the determination of the viewer's interest can be based on a variety of items including amongst other things; previously defined user profile, viewing history and/or a user input (e.g., if the user enters a search term on the website or software application presenting the potential Content on the user interface of the viewing device).

In this example, the Programming Rules (104) identify metadata tags for the videos in the Available Content Library associated with "Beauty", "Beauty Products", or similar tags. In one further aspect of this example, the programmer/administrator/business may choose to only allow Beauty Product videos created in the last year to be viewed—which reduces the possible playlist videos down to 800 videos. A prioritization rule based upon recentness of video creation may also be added. The business may also require that the Inventory Data (102) indicate that there is available physical inventory related to any Beauty Product video that is to be shown—which reduces the possible playlist videos down to 750 videos. These rules and prioritizations combined with the Viewership/Sales History (103) data to help to form the Programming Rules (104).

Viewership/Sales Trends (105) data shows that on third-party video distribution platforms (e.g., Facebook or Youtube) "Beauty Product" videos focused on "Spring Looks" (another metadata tag) are currently unpopular (e.g., get few "likes" or "thumbs up") and Viewership/Sales History (103) data shows that "Spring Looks" videos on internal platforms get limited views and low sales while "Fall Looks" videos are trending higher with growing sales performance. The combination of these data elements can be used by the Predictive Rules (106) engine to identify videos that would exhibit the highest level of viewer satisfaction and related business success. The removal of "Spring Looks" videos reduces the potential playlist down to 600 videos, additionally the 200 "Fall Looks" Beauty Product videos are specially tagged with a higher prioritization of airing because of their higher business potential. Furthermore, based on data related to the individual viewer, it is known that they prefer video content that focuses on "Beauty Product" solutions for women over the age of 40, thus videos of this nature get a preferential tagging indicator. The magnitude of the relative performance (internally or externally) of the various video types may be used to drive the relative strength of the tagging indicator (high or low) and this relative strength indicator may be used in conjunction with the Randomized Individual Playlist (113) process to further improve the quality of the resulting final playlist such that the playlist is more likely to achieve the pre-defined goal(s).

The Content Rule Set (107) combines the Programming Rules (104) limitations, which has reduced the potential playlist videos down to 750 videos, and the Predictive Rules (106) which further reduced the potential playlist down to 600 videos. These 600 "Beauty Product" videos represent the Potential Playlist (112). None, some, or all of the Potential Playlist (112) videos may have a tagging indicator to represent the relative match of the video to some programming rule or viewership/sales metric which may be used to give the individual tagged videos a level of priority.

As described above, the Randomized Individual Playlist (113) may now sort through the 600 qualifying "Beauty Product" videos to create a playlist of 100 "Beauty Products" videos (the size of the final playlist may be set by the programmer/business based on a variety of parameters including but not limited to the total number of video assets or the desired total duration of the playlist). In the process of selecting the 100 "Beauty Products" videos, prioritization tags (in this example prioritization related to recent video creation, the video being related to "Fall Looks", and the video providing beauty solutions for woman over the age of 40) influence the likelihood of any given video being included in the final playlist. There may be a variety of different rules each with a weight of between −100% (guaranteed to be excluded) to 0% (completely neutral) to 100% (guaranteed to be included) which combine along with random choice to create the final playlist. Additionally, various prioritization rules may overlap such that the final prioritization may be a product (or sum depending on approach) of the individual prioritization rule values, or some prioritization rules may be absolute (to include or not to include or to include in a particular playlist or at a particular playlist position). A possible visualization of the system is as a Venn diagram or as a set of stacked Venn diagrams to identify the set of qualifying videos and their respective prioritization (weighting).

Rules and randomization (with associated weights and prioritizations) may be placed upon not just the inclusion of certain videos in the final playlist, they can also be applied to the position within the final playlist the specific videos occupy. The prioritization and randomization processes may also be applied to arrive at the sequence of playout for the videos in the final playlist (or channel). Thus, for example an individual video may not only have a high likelihood of being included in the playlist but it may also have a high likelihood of being one of the first videos presented when a viewer requests the playlist. As discussed earlier the weighting or prioritization of Content in a playlist may be arrived at by a variety of means by an individual or by a system and take into consideration, by way of example, but not limitation; Content that is preferred by the Content provider, Content provider featured Content, sale Content, timely Content, excess inventory Content, Content that is ranked highly by various statistical models, Content or Content types selected or preferred by the user (or other users), etc. Alternatively, there can be an example of a video that has a low likelihood of being included in the final playlist (or channel), and if in fact it is included in the final playlist it would be placed at the end of the sequence of videos.

The Randomized Individual Playlist (113) in this example may now find that 200 of the videos are always prioritized sufficiently such that they will always qualify to be included in the 100 video final playlist. If the 200 videos all have an equal prioritization value, the Randomized Individual Playlist will randomly select 100 "Beauty Product" videos from the list of 200 qualifying videos to be played out when the viewer requests a "Beauty Product" playlist. In an alternative example, the Randomized Individual Playlist (113) system may employ different levels of randomization based on different levels of prioritization that various videos have depending on rules set by the programmer/business such that 50 of the videos have a very high likelihood of being in the playlist, 100 videos have an average likelihood of being included in the playlist and 50 videos have a very low likelihood of being included in the playlist. In this example the resulting playlist of 100 initial videos includes 45 of the highly likely videos 50 average likely videos and 5 unlikely videos. The Programming and Randomization Rules now collectively are further revised to arrive at the initial order of the playlist of the selected 100 videos.

Once the final playlist (in order) has been decided upon, the Playout Server (114) distributes the video(s) (or the URLs related to the final playlist) toward the Distribution System (115) which may be the end viewer or a system that serves the end viewer. In general, the term "media Content items", as used herein, refers to both selected video and/or URLs to be transmitted to the viewing device. Moreover, in an exemplary aspect, the actual viewing/shopping behavior of the viewer is tracked by the Viewership/Sales History Reporting (116) system and this information helps inform future programming rules in the Viewership/Sales History (103) process.

This monitoring and influencing system may happen in real time such that based on the viewer's behavior (or alternatively based on changes to the Programming Rules (104) or the Available Content Library (111)), the final playlist may be adjusted in real time to further optimize the viewer experience. For example if the viewer watches in their entirety videos related to facial "Beauty Products", but skips videos related to "Beauty Products" for other body parts, the playlist may be adjusted to add more and place higher in the playout sequence videos related to facial "Beauty Products" (giving them a higher overall prioritization). For example, the Programming Rules (104) may be configured to adjust the weighting factors for each category of video to ensure the higher weight video corresponds to the prefer view videos (e.g., videos related to facial "Beauty Products" in this example). Furthermore, if the viewer chooses to purchase an item (e.g., "Smokey Eyes Mascara for Fall"), that information may be fed back into the system to increase the prioritization of other videos of products that have a history of selling to people that buy Smokey Eyes Mascara for Fall in order to improve the likelihood of achieving the goal of increased product sales.

As a result of this process, whenever a viewer requests a playlist, the viewer is presented with an individualized playlist that combines the programming/business rules with viewership preferences and a randomized "shuffling" of the qualified videos such that (given a sufficient population of videos to choose from or a rule to not repeat a playlist to a viewer) each time a playlist is requested it feels like it is a fresh line-up of content without too much repetition—like a live linear channel. Or alternatively if it is found that it is more effective in achieving a goal of sales to present a product repeatedly to viewers the frequency of some individual items may be presented more often.

The described system and method provides a highly efficient playlist creation process that is controlled by the programmer/administrator/business such that it provides to the viewer a highly personalized tailored final playlist that includes a degree of randomization to make the channel feel new, provide for serendipitous discovery of content (e.g., it provides the viewer something they are likely to be interested in but did not know that they were specifically interested in), and provide additional data for the system to learn from to further improve the presentation process to better achieve the given goals. Furthermore, by doing all of the final playlist creation process on the programmer server side it reduces the distribution cost and system overhead (both in terms of the required bandwidth and storage capacity of a CDN or a viewer) of broadly distributing many videos to the edge or to the individual. In this example instead of distributing 10,000 videos to the edge to be chosen from—only 200 videos have to be pushed to the edge such that 100 videos can populate the final playlist at any given time. Moreover, unnecessary bandwidth consumption and use of distributor and user device resources is significantly reduced as only video media Content with a high level of user interest and likelihood of being watched are actually selected and transmitted to the viewer. Thus, creating a better experience for the user and also being more profitable for the Content distributor.

In addition, this system does not require any explicit viewer input beyond the general playlist request and the entire process is optimized for the viewer—the viewer does not have to search or browse through 10,000 potential videos to find something that they want to see or randomly choosing videos out of the 10,000 potential videos. Also, this system is more beneficial to the programmer/administrator/business because it makes it more likely that it is delivering more relevant content to the viewer and as such the viewer will engage deeper for longer increasing viewership and potentially related sales.

Additional embodiments of the present invention may be related to dynamic storytelling. This invention may be used to create actual stories or story lines for videos, text based stories, audio stories, video games, etc. such that non-predetermined stories may be created for individual users or groups of users. Furthermore, these non-pre-determined stories may interact with each other such that multiple users may collectively experience related, intertwined, but individualized "stories" (playlists). Additionally machine learning/AI may be used to create, model, run test versions, monitor, analyze, and iteratively improve these playlists. Furthermore, this invention may also be utilized in very different environments such as in biological evolutionary modeling where this system may be applied to review potential future states of organisms or populations.

Another possible embodiment of the invention is an example where the Available Content Library (111) is delivered in whole or in part via one to one, one to many, or one to all distribution technology, including but not limited to, over the air broadcast (including ATSC 1.0 or 3.0), satellite broadcast, Wi-Fi broadcast, or wired broadcast to the users' location or the users' content consumption device and the rules and processes that define the Randomized Individual Playlist (113) are also sent via a distribution technology (see above) such that the collection of rules are applied to the Available Content Library locally for the user creating the final playlist that is played out. Furthermore, the users' connected device may be communicatively connected to the rest of the system to enable dynamic feedback related to the playlist and updating the playlist periodically or continuously.

One exemplary system that recognizes an item (or sets of items) in source Content and identifies additional data or metadata about the identified item(s) and may recognize given items in the Content and replaces it with alternative items, as in U.S. Pat. Nos. 9,167,304, 9,344,774, 9,503,762, and 9,681,202, the contents of which are hereby incorporated by reference.

In one embodiment, the system either automatically, or in response to user control, launches an electronic shopping application enabling the user to purchase one or more of the displayed products. Exemplary applications include the electronic shopping systems disclosed in U.S. Pat. Nos. 7,752,083, 7,756,758, 8,326,692, 8,423,421, 8,768,781, 9,117,234, and 9,697,549 and U.S. Patent Publication No. 2014/731594, the contents of each of which are hereby incorporated by reference.

Figure 3:
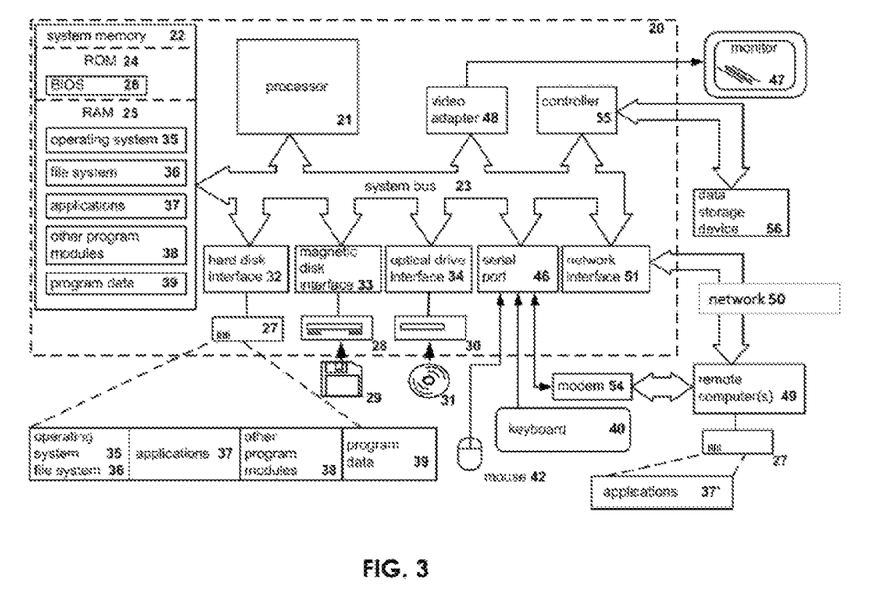
FIG. 3 illustrates an example of a general purpose computer system in accordance with an exemplary embodiment.

FIG. 3 illustrates an example of a general-purpose computer system (which may be a personal computer, a server, or a plurality of personal computers and servers) on which the disclosed system and method can be implemented according to an example aspect. It should be appreciated that the detailed general-purpose computer system can correspond to the Rule Based Randomized Individualized Content Management System (100) described above with respect to FIG. 1 to implement the algorithms described above. This general-purpose computer system may exist in a single physical location, with a broadly distributed structure, virtually as a subset of larger computing systems (e.g. in the computing "cloud"), or a combination of any of these.

As shown, the computer system 20 includes a central processing unit 21, a system memory 22 and a system bus 23 connecting the various system components, including the memory associated with the central processing unit 21. The central processing unit 21 can be provided to execute software code (or modules) for the one or more set of rules discussed above which can be stored and updated on the system memory 22. Additionally, the central processing unit 21 may be capable of executing traditional computing logic, quantum computing, or a combination of both. Furthermore, the system bus 23 is realized like any bus structure known from the prior art, including in turn a bus memory or bus memory controller, a peripheral bus and a local bus, which is able to interact with any other bus architecture. The system memory includes read only memory (ROM) 24 and random-access memory (RAM) 25. The basic input/output system (BIOS) 26 includes the basic procedures ensuring the transfer of information between elements of the personal computer 20, such as those at the time of loading the operating system with the use of the ROM 24.

As noted above, the rules described above can be implemented as modules according to an exemplary aspect. As used herein, the term "module" refers to a real-world device, component, or arrangement of components implemented using hardware, such as by an application specific integrated circuit (ASIC) or field-programmable gate array (FPGA), for example, or as a combination of hardware and software, such as by a microprocessor system and a set of instructions to implement the module's functionality, which (while being executed) transform the microprocessor system into a special-purpose device. A module can also be implemented as a combination of the two, with certain functions facilitated by hardware alone, and other functions facilitated by a combination of hardware and software. In certain implementations, at least a portion, and in some cases, all, of a module can be executed on the processor of a general purpose computer. Accordingly, each module can be realized in a variety of suitable configurations, and should not be limited to any example implementation exemplified herein.

The personal computer 20, in turn, includes a hard disk 27 for reading and writing of data, a magnetic disk drive 28 for reading and writing on removable magnetic disks 29 and an optical drive 30 for reading and writing on removable optical disks 31, such as CD-ROM, DVD-ROM and other optical information media. The hard disk 27, the magnetic disk drive 28, and the optical drive 30 are connected to the system bus 23 across the hard disk interface 32, the magnetic disk interface 33 and the optical drive interface 34, respectively. The drives and the corresponding computer information media are power-independent modules for storage of computer instructions, data structures, program modules and other data of the personal computer 20. Moreover, it is noted that any of the storage mechanisms (including data storage device 56, which may be amongst other things, physical hardware, CDN(s), or the "cloud") can serve as the storage of the media Content, including the Available Content Library (111) described above, according to an exemplary aspect as would be appreciated to one skilled in the art.

The present disclosure provides the implementation of a system that uses a hard disk 27, a removable magnetic disk 29 and/or a removable optical disk 31, but it should be understood that it is possible to employ other types of computer information media 56 which are able to store data in a form readable by a computer (solid state drives, flash memory cards, digital disks, random-access memory (RAM) and so on), which are connected to the system bus 23 via the controller 55.

The computer 20 has a file system 36, where the recorded operating system 35 is kept, and also additional program applications 37, other program modules 38 and program data 39. The user is able to enter commands and information into the personal computer 20 by using input devices (keyboard 40, mouse 42). Other input devices (not shown) can be used: microphone, joystick, game controller, scanner, other computer systems, and so on. Such input devices usually plug into the computer system 20 through a serial port 46, which in turn is connected to the system bus, but they can be connected in other ways, for example, with the aid of a parallel port, a game port, a universal serial bus (USB), a wired network connection, or wireless data transfer protocol. A monitor 47 or other type of display device is also connected to the system bus 23 across an interface, such as a video adapter 48. In addition to the monitor 47, the personal computer can be equipped with other peripheral output devices (not shown), such as loudspeakers, a printer, and so on.

The personal computer 20 is able to operate within a network environment, using a network connection to one or more remote computers 49, which can correspond to the remote viewing devices, i.e., the IP connected device (e.g., a smartphone, tablet, personal computer, laptop, media display device, or the like). Other devices can also be present in the computer network, such as routers, network stations, peer devices or other network nodes.

Network connections 50 can form a local-area computer network (LAN), such as a wired and/or wireless network, and a wide-area computer network (WAN). Such networks are used in corporate computer networks and internal company networks, and they generally have access to the Internet. In LAN or WAN networks, the personal computer 20 is connected to the network 50 across a network adapter or network interface 51. When networks are used, the personal computer 20 can employ a modem 54 or other modules for providing communications with a wide-area computer network such as the Internet or the cloud. The modem 54, which is an internal or external device, is connected to the system bus 23 by a serial port 46. It should be noted that the network connections are only examples and need not depict the exact configuration of the network, i.e., in reality there are other ways of establishing a connection of one computer to another by technical communication modules, such as Bluetooth.

In various aspects, the systems and methods described herein may be implemented in hardware, software, firmware, or any combination thereof. If implemented in software, the methods may be stored as one or more instructions or code on a non-transitory computer-readable medium. Computer-readable medium includes data storage. By way of example, and not limitation, such computer-readable medium can comprise RAM, ROM, EEPROM, CD-ROM, Flash memory or other types of electric, magnetic, or optical storage medium, or any other medium that can be used to carry or store desired program code in the form of instructions or data structures and that can be accessed by a processor of a general purpose computer.

In the interest of clarity, not all of the routine features of the aspects are disclosed herein. It will be appreciated that in the development of any actual implementation of the present disclosure, numerous implementation-specific decisions must be made in order to achieve the developer's specific goals, and that these specific goals will vary for different implementations and different developers. It will be appreciated that such a development effort might be complex and time-consuming, but would nevertheless be a routine undertaking of engineering for those of ordinary skill in the art having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

What is claimed:

1. A method for selecting and streaming video content to a media display device to minimize network resource consumption, the method comprising:
   storing, in at least one electronic database associated with at least one server, a plurality of videos configured to be transmitted towards and displayed by the media display device, the plurality of videos each associated with corresponding category metadata that identifies video content items displayed in the respective videos with at least one corresponding category;
   generating, by a programming rules engine associated with the at least one server, a list of approved videos based at least on a plurality of business rules;

generating, by a predictive rules engine associated with the at least one server, at least one video content selection characteristic based on data relating to at least one of the media display device and media consumption data associated with a viewer of the media display device and that includes content consuming history by the viewer of the media display device;

generating, by a video content playlist engine associated with the at least one server, a video content playlist by applying the generated at least one video content selection characteristic to the list of approved videos to select a subset of the plurality of videos based on the respective category metadata of the selected subset of the plurality of videos, such that the network resource consumption is minimized by selecting the subset of the plurality of videos by targeting the viewer of the media display device according to the plurality of business rules;

applying randomization rules to the generated video content playlist to randomize the selected subset of the plurality of videos before the selected subset is streamed towards the media display device;

streaming, by the at least one server towards the media display device, a single data stream containing the selected and randomized subset of the plurality of videos that includes the respective videos in a sequential order based on the randomization rules applied to the generated video content playlist, such that upon receiving the single data stream of videos, the media display device is configured to automatically display the respective videos in the sequential order received thereby without receiving an explicit viewer input on the media display device to display the received respective videos;

receiving updates to the content consuming history that indicates consumed data relating to a subset of the plurality of videos of the single data stream that were previously skipped, partially skipped and fully watched by the viewer of the media display device;

correlating the respective video content items displayed in the subset of the plurality of videos that are of interest to the viewer based on the consumed data;

modifying, by the predictive rules engine, the at least one video content selection characteristic based on the received updates to the media consumption data that includes the correlated video content items that are of interest to the viewer; and dynamically modifying, by the video content playlist engine, the content playlist by applying the modified at least one video content selection characteristic to the plurality of video content items to select at least one additional video content item to be added to the content playlist that is different than the content items included in the list of approved video content items.

2. The method according to claim 1, further comprising generating, by the programming rules engine associated with the at least one server, the list of approved videos based on a plurality of inventory data relating to products associated with the video content items displayed in the plurality of videos, respectively.

3. The method according to claim 2, further comprising generating, by the programming rules engine associated with the at least one server, the list of approved videos based on the content consuming history by the viewer of the media display device.

4. The method according to claim 1, wherein the plurality of videos comprise a plurality of URLs configured to access a plurality of video files when selected by the media display device.

5. The method according to claim 1, further comprising:
determining at least one of hardware parameters and software parameters of the media display device; and
automatically generating, by the predictive rules engine associated with the at least one server, the at least one video content selection characteristic based on the determined at least one of the hardware and software parameters of the media display device.

6. The method according to claim 1, further comprising receiving, by the predictive rules engine associated with the at least one server, the media consumption data associated with the viewer of the media display device that is generated during the display of the selected and streamed randomized subset of the plurality of videos by the media display device.

7. The method according to claim 6, further comprising:
dynamically updating, by the predictive rules engine associated with the at least one server, the at least one video content selection characteristic based on the received media consumption data that is generated during the display of the selected and streamed randomized subset of the plurality of videos by the media display device; and
dynamically updating, by the video content playlist engine associated with the at least one server, the video content playlist based on the dynamically updated at least one video content selection characteristic to minimize inclusion of videos predicted to be skipped by the viewer of the media display device.

8. The method according to claim 1, further comprising determining a weighing for the selected and randomized subset of the plurality of videos and streaming the selected and randomized subset of the plurality of videos in an order based on the determined weighing.

9. The method according to claim 1, further comprising:
categorizing, by the video content playlist engine associated with the at least one server, the viewer of the media display device based on the media consumption data associated with the viewer; and
generating, by the video content playlist engine associated with the at least one server, the video content playlist by selecting the subset of the plurality of videos based on comparing the respective category metadata with the categorized viewer.

10. A system for selecting and streaming video content toward a media display device to minimize network resource consumption, the system comprising:
at least one electronic database configured to store a plurality of videos configured to be transmitted towards and displayed by the media display device, the plurality of videos each associated with corresponding category metadata that identifies video content items displayed in the respective videos with at least one corresponding category;
at least one processor with software instructions stored thereon that, when executed by the at least one processor, configure the at least one processor to execute:
a programming rules engine configured to generate a list of approved videos based at least on a plurality of business rules,
a predictive rules engine configured to generate at least one video content selection characteristic based on data relating to at least one of the media display device and media consumption data associated with a viewer of the media display device and that includes content consuming history by the viewer of the media display device, a video content playlist engine configured to generate a video content playlist by applying the generated at least one video content selection characteristic to the list of approved videos to select a subset of the plurality of videos based on the respective category metadata of the selected subset of the plurality of videos, such that the network resource consumption is minimized by selecting the subset of the plurality of videos by targeting the viewer of the media display device according to the plurality of business rules;

a randomization rules engine configured to apply randomization rules to the generated video content playlist to randomize the selected subset of the plurality of videos before the selected subset is streamed towards the media display device; and at least one server configured to stream towards the media display device a single data stream containing the selected and randomized subset of the plurality of videos that includes the respective videos in a sequential order based on the randomization rules applied to the generated video content playlist, such that upon receiving the single data stream of videos, the media display device is configured to automatically display the respective videos in the sequential order received thereby without receiving an explicit viewer input on the media display device to display the received respective videos;

wherein the predictive rules engine is further configured to:

receive updates to the content consuming history that indicates consumed data relating to a subset of the plurality of videos of the single data stream that were previously skipped, partially skipped and fully watched by the viewer of the media display device;

correlate the respective video content items displayed in subset of the plurality of videos that are of interest to the viewer based on the consumed data; and modify the at least one video content selection characteristic based on the received updates to the media consumption data that includes the correlated video content items that are of interest to the viewer; and wherein the video content playlist engine is further configured to dynamically modify the content playlist by applying the modified at least one video content selection characteristic to the plurality of video content items to select at least one additional video content item to be added to the content playlist that is different than the content items included in the list of approved video content items.

11. The system according to claim 10, wherein the programming rules engine is further configured to generate the list of approved videos based on a plurality of inventory data relating to products associated with the video content items displayed in the plurality of videos, respectively.

12. The system according to claim 11, wherein the programming rules engine is further configured to generate the list of approved videos based on content consuming history by the viewer of the media display device.

13. The system according to claim 10, wherein the plurality of videos comprise a plurality of URLs configured to access a plurality of video files when selected by the media display device.

14. The system according to claim 10, wherein the predictive rules engine is further configured to:

determine at least one of hardware parameters and software parameters of the media display device; and automatically generate the at least one video content selection characteristic based on the determined at least one of the hardware and software parameters of the media display device.

15. The system according to claim 10, wherein the predictive rules engine is further configured to receive the media consumption data associated with the viewer of the media display device that is generated during the display of the selected and streamed randomized subset of the plurality of videos thereby the media display device.

16. The system according to claim 15, wherein the predictive rules engine is further configured to dynamically update the at least one video content selection characteristic based on the received media consumption data that is generated during the display of the selected and streamed randomized subset of the plurality of videos by the media display device, and wherein the video content playlist engine is further configured to dynamically update the video content playlist based on the dynamically updated at least one video content selection characteristic to minimize inclusion of videos predicted to be skipped by the viewer of the media display device.

17. The system according to claim 10, wherein the video content playlist engine is further configured to determine a weighing for the selected and randomized subset of the plurality of videos, and wherein the at least one server streams the selected and randomized subset of the plurality of videos in an order based on the determined weighing.

18. The system according to claim 10, wherein the video content playlist engine is further configured to:

categorize the viewer of the media display device based on the media consumption data associated with the viewer; and generate the video content playlist by selecting the subset of the plurality of videos based on comparing the respective category metadata with the categorized viewer.

* * * * *